US008639369B1

(12) United States Patent
Clark

(10) Patent No.: US 8,639,369 B1
(45) Date of Patent: Jan. 28, 2014

(54) AUDIO TESTING OF MEDIA PLAYER

(75) Inventor: Jeromie L. Clark, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 910 days.

(21) Appl. No.: 12/552,071

(22) Filed: Sep. 1, 2009

(51) Int. Cl.
*G06F 17/00* (2006.01)

(52) U.S. Cl.
USPC ............................................................ 700/94

(58) Field of Classification Search
USPC .............. 700/94; 704/500–504, 203; 714/700
See application file for complete search history.

(56) References Cited

U.S. PATENT DOCUMENTS

| | | | | |
|---|---|---|---|---|
| 7,978,613 | B2 * | 7/2011 | Gray et al. | 370/241 |
| 2006/0212769 | A1 * | 9/2006 | Saito et al. | 714/741 |
| 2009/0310671 | A1 * | 12/2009 | Reynolds et al. | 375/240.01 |
| 2010/0017691 | A1 * | 1/2010 | Lin et al. | 714/799 |

OTHER PUBLICATIONS

PSQM (Perceptual Speech Quality Measure) description; retrieved from http://en.wikipedia.org/wiki/PSQM on Dec. 10, 2012.*

* cited by examiner

*Primary Examiner* — Andrew C Flanders
(74) *Attorney, Agent, or Firm* — Kilpatrick Townsend & Stockton LLP

(57) ABSTRACT

According to example configurations as described herein, an audio tester configures a media player to decode audio data encoded according to a particular encoding format. The particular encoding format can be selected from multiple different encoding formats supported by the media player. During testing, the tester retrieves a set of multiple audio playback files for testing the particular encoding format. Each audio playback file in the set can include test audio data encoded according to a different respective parameter setting of the particular encoding format. By way of a non-limiting example, the particular decoding format can support different parameter settings such as different bit rates, different types of compression, different sample sizes, different rates of interpreting encoded data, etc. The tester verifies the fidelity of audio produced by decoding, in the media player, the test audio data obtained from a matrix of multiple audio playback files.

20 Claims, 7 Drawing Sheets

AUDIO TESTING OF MEDIA PLAYER

BACKGROUND

Conventional media players enable a user to receive data over a network connection and play back data for viewing or listening by a respective user. For example, a media player is typically configured with a particular type of decoder capable of decoding the received data. During operation, the decoder of the media player decodes the received data into a format that can be interpreted and therefore played back by the media player.

The conventional media players as discussed above sometimes support many different types of decoders. Each decoding format supported by a respective decoder typically supports different audio playback files to accommodate needs of different users. For example, certain user may require better quality than others. In such an instance, respective audio playback data can include a high bit rate setting to produce better quality audio when decoded by the decoder in the media player. Thus, a single decoder may need to support a range of different bit rate settings.

A decoder may support other parameters such as different compression types, interpretation rates, data sample sizes, etc. Accordingly, a significant amount of testing is required to ensure that a media player and its corresponding decoder can properly decode received playback data for each of the different possible playback settings.

BRIEF DESCRIPTION

Conventional testing of decoders and respective media players suffer from a number of deficiencies. For example, as mentioned above, certain conventional testing methods include configuring a media player with a decoder under test. A human operator then initiates playback of an audio test file. The human operator then listens to audio output generated by the media player to determine whether or not the decoder in the media player is able to properly decode the audio test file. Such a process can be time consuming and lack any true quality control standards because the operator may not be able to audibly detect errors in the audio being played back.

Embodiments herein deviate with respect to conventional test applications. For example, embodiments herein are directed to unique ways of testing different decoder configurations and an ability of media player decoders to properly playback audio data. Other embodiments herein include novel playback files and one or more matrices of playback files for testing media player decoders based on a variation of one or more parameter settings. Yet other embodiments serve other useful purposes as specifically discussed and implied below.

More specifically, one embodiment herein includes configuring a media player to decode audio data encoded according to a particular encoding format. The particular encoding format can be selected from multiple different encoding formats supported by the media player. The media player can be configured according to the particular encoding format by configuring the media player with a so-called codec having the ability to decode data encoded according to the particular encoding format. To facilitate testing, a tester retrieves a set of multiple audio playback files for testing the particular encoding format.

In one embodiment, each audio playback file in the set includes test audio data encoded according to a different respective parameter setting of the particular encoding format. By way of a non-limiting example, the particular decoding format can support different parameter settings such as different bit rates, different types of compression, different sample sizes, different rates of interpreting encoded data, different sample rates associated with the data being played back, etc.

During operation, the tester verifies the fidelity of audio produced by decoding, in the media player, the test audio data obtained from the set of multiple audio playback files. Testing at multiple different parameter settings in this manner ensures the integrity of the media player and corresponding decoder used to decode the particular encoding format.

In one embodiment, the tester maps an identity of the particular encoding format to the set of audio playback files via a respective mapping function. Thus, the tester can configure a media player with a first type of decoder and, via the mapping function, identify a corresponding set of playback files to test the first type of decoder at multiple different settings. Thereafter, the tester can configure the media player with a second type of decoder and, via the mapping function, identify a corresponding set of playback files to test the second type of decoder at multiple different parameter settings. Accordingly, the tester can initiate testing of each of multiple different types of coders using different sets of appropriate test files.

As previously mentioned, for each decoder being tested, the tester can initiate testing of a respective decoder according to multiple different parameter settings and one or more selected test tones. For example, in such an embodiment, the tester retrieves a first audio file to test a first decoder. Assume that the first decoder is configured to decode according to a first decoding format. The first audio file can include a test sample representing a first predefined audio test signal such as an 20 hertz tone (e.g., based on a sine wave) encoded according to the first decoding format. The first audio file can specify a playback time such as an amount of time to playback the first audio test signal.

The first audio file also can include a test sample representing a second predefined audio test signal such as a 40 hertz tone (e.g., based on a sine wave) encoded according to the first decoding format. The first audio file also can specify a playback time such as an amount of time to playback the second audio test signal.

Additionally, the first audio file also can include a test sample representing a third predefined audio test signal such as an 80 hertz tone (e.g., based on a sine wave) encoded according to the first decoding format. The first audio file can specify a playback time such as an amount of time to playback the third audio test signal. Thus, each audio file can specify a number of different test tones or frequencies at which to test the first decoder.

Each of the encoded test audio signals in the first audio file can be encoded according to a first setting of a selected parameter associated with the first decoding format. Another audio test file (e.g., a second audio file) can be used to test the first decoder at a second setting of the selected parameter associated with the first decoding format to verify the decoder/media player across a range of settings for the selected parameter. Thus, the decoder/media player can be tested at a number of different test tones based on testing each of multiple different settings of a selected parameter.

As previously discussed, each decoding format can support different parameter settings such as different bit rates, different types compression, different sample sizes, different rates of interpreting encoded data, etc. In accordance with embodiments herein, a matrix of audio files can be used to test each decoder under test. For example, the first audio file, second audio file, etc., as discussed above can be part of a first array of audio files in a matrix for testing a first parameter setting of a respective decoder. A first array of audio files in the matrix thus can test different settings of a first selected parameter (under test) of the decoder being tested. A second array of audio files in the matrix of audio files can be used to test different settings of a second selected parameter (under test) of the decoder being tested, and so on. Accordingly, a tester according to embodiments herein can verify a fidelity of audio produced by decoding, in the media player, the test audio data obtained from the multiple sets of audio playback files in a respective matrix.

By way of a non-limiting example, each of the test audio files in the matrix can be configured to test a number of test frequency settings such as 20 Hz, 40 Hz, 80 Hz, etc., as discussed above. In such an embodiment, the tester verifies that audio produced by the media player for each of the different test settings fall within an appropriate frequency range.

These and other embodiment variations are discussed in more detail below.

As mentioned above, note that embodiments herein can include a configuration of one or more computerized devices, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product that has a computer-storage medium including computer program logic encoded thereon that, when performed in a computerized device having a processor and corresponding memory, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

Accordingly, one particular embodiment of the present disclosure is directed to a computer program product that includes a computer readable medium having instructions stored thereon for supporting operations such as audio testing. The instructions, when carried out by a processor of a respective computer device such as a test manager, cause the processor to: configure a media player to decode audio data encoded according to a particular encoding format, the particular encoding format being selected from multiple encoding formats supported by the media player; retrieve a set of multiple audio playback files for testing the particular encoding format, each audio playback file in the set including test audio data encoded according to a different respective parameter setting of the particular encoding format; and verify fidelity of audio produced by decoding, in the media player, the test audio data obtained from the set of multiple audio playback files. The ordering of the steps has been added for clarity sake. These steps can be performed in any suitable order.

Other embodiments of the present disclosure include software programs to perform any of the method embodiment steps and operations summarized above and disclosed in detail below.

Also, it is to be understood that the system, method, apparatus, instructions on computer readable storage media, etc., as discussed herein can be embodied strictly as a software program, as a hybrid of software and hardware, or as hardware alone such as within a processor, or within an operating system or a within a software application. Example embodiments of the invention may be implemented within products and/or software applications such as those manufactured by Adobe Systems Incorporated of San Jose, Calif., USA.

As discussed above, techniques herein are well suited for use in media player testing applications. However, it should be noted that embodiments herein are not limited to use in such applications and that the techniques discussed herein are well suited for other applications as well.

Additionally, although each of the different features, techniques, configurations, etc., herein may be discussed in different places of this disclosure, it is intended that each of the concepts can be executed independently of each other or in combination with each other. Accordingly, the one or more present inventions as described herein can be embodied and viewed in many different ways.

Also, note that this preliminary discussion of embodiments herein does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

According to example embodiments as described herein, an audio test manager configures a media player with a respective decoder. The decoder supports a particular encoding format. The particular encoding format and respective decoder can be selected from multiple different encoding formats supported by the media player. During testing, the test manager retrieves a set of one or more audio playback files from a set of audio test files for testing the decoder and particular encoding format. The set of audio test files can be a matrix of audio test files. Each audio playback file in the matrix can include test audio data encoded according to a different respective parameter setting of the particular encoding format. By way of a non-limiting example, the particular decoding format can support different parameter settings such as different bit rates, different types of compression, different sample sizes, different rates of interpreting encoded data, different sample rates associated with the playback data, etc. The test manager verifies the integrity of audio produced by decoding, in the media player, the test audio data obtained from the set of multiple audio playback files.

Figure 1:
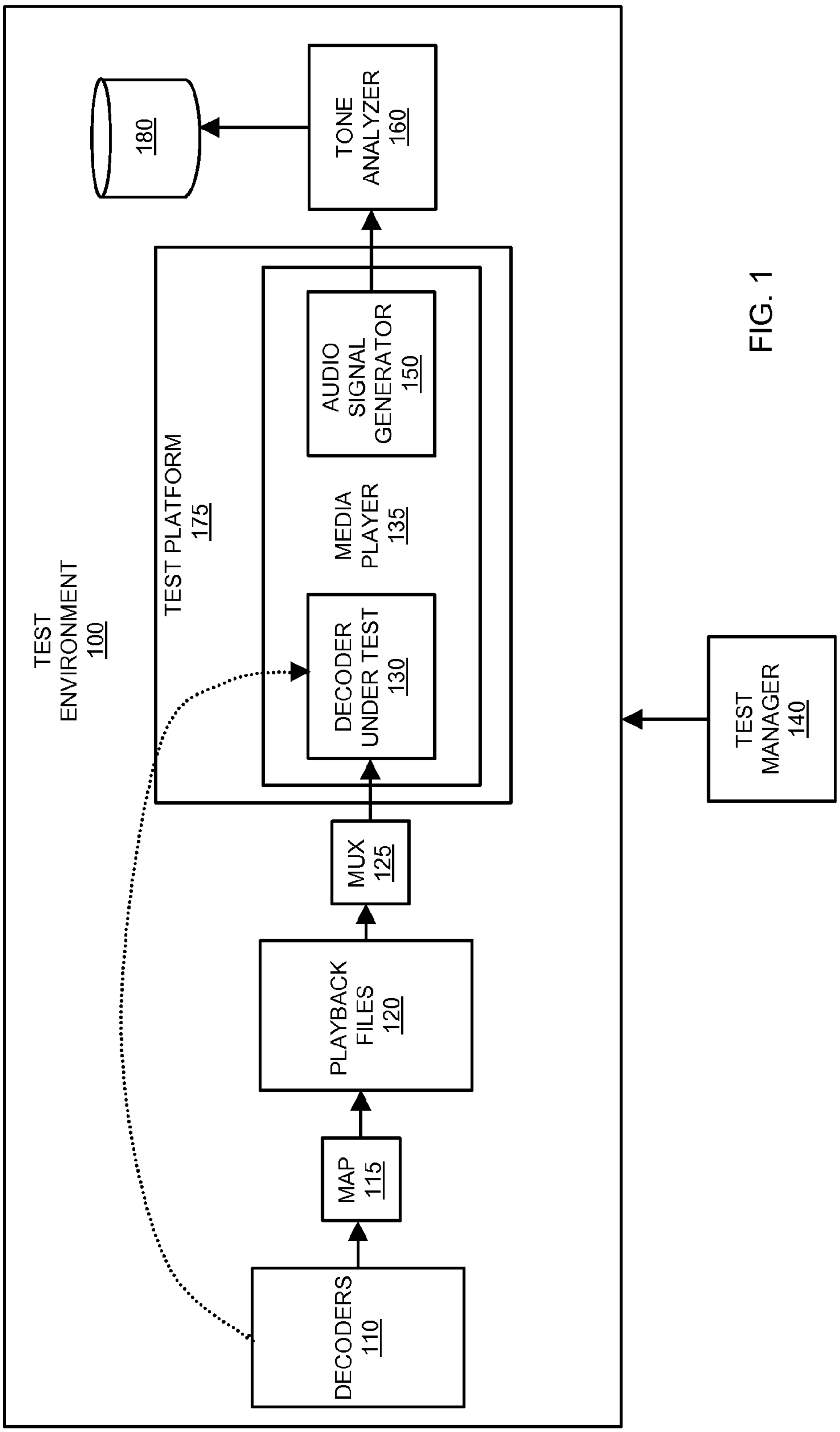
FIG. 1 is an example diagram of a computer environment enabling creation and management of workflows according to embodiments herein.

FIG. 1 is an example diagram illustrating a test environment 100 according to embodiments herein. As shown, test environment 100 includes a test manager 140, decoders 110, map 115, playback files 120, multiplexer 125, test platform 175, media player 135, decoder under test 130, audio signal generator 150, tone analyzer 160, and repository 180.

In general, the test environment 100 enables testing of multiple different decoders 110 for a range of different parameter settings.

In one example embodiment, during operation, the test manager 140 initiates configuring the media player 135 with a decoder selected from decoders 110. As its name suggests, the decoder under test 130 in the media player 135 represents the decoder being tested.

Playback files 120 represent a set of audio test files for testing each of the decoders 110. Map 115 specifies which set of audio test files in playback files 120 can be used for testing a respective decoder 110. The test manager 140 can utilize the map 115 to identify which set of playback test files for testing the decoder under test 130.

Subsequent to determining the appropriate set of audio test files for testing the decoder under test 125, the test manager 140 initiates generation of corresponding audio test data streams through multiplexer 125 to the decoder under test 130 of media player 135. The playback files 120 can include executable instructions for generating a data stream or the actual encoded raw data to be transmitted to the media player 135.

The decoder under test 130 decodes the received audio test streams for playback by the audio signal generator 150. Audio signal generator 150 produces an audio signal that is, in turn, analyzed by tone analyzer 160. The test manager 140 can provide appropriate command/control information so that the tone analyzer 160 knows when to expect presence of an audio signal outputted from audio signal generator 150, a frequency range in which the received tone should reside, etc. Tone analyzer 160 can be configured to record results of a respective test tone in repository 180. Accordingly, the test results in repository 180 can be retrieved at a later time via test manager 140 to determine whether a respective decoder under test 130 works properly.

In one embodiment, audio signal generator 150 includes an audio driver circuit and speaker to generate an audio signal though the air to the tone analyzer. In such an embodiment, the tone analyzer 160 can include a microphone to receive the audio signal and generate a representative electrical signal for further analyzing by a tone measuring device such as a zero crossing detector.

In another embodiment, an analog signal produced by audio signal generator 150 can be outputted directly to an analog-to-digital converter in the tone analyzer. A signal processor in the analyzer 160 converts the signal produced by the media player 135 into a frequency. The frequency of the test signal is then compared to an acceptable frequency range to determine whether the decoder is able to properly decode the test playback data according to the particular decoder under test 130.

Note that in yet further embodiments, the media player 175 can be configured to include the tone analyzer 160. In such an embodiment, the test manager 140 can communicate with the media player 135 to notify the media player 135 of test audio data being decoded by the decoder under test 130 and expected results of decoding the received data. In one embodiment, playback files can include setting information that is transmitted to the media player 135 to indicate a frequency range within which the output audio signal from the audio signal generator should reside. Accordingly, the media player 135 can be configured to determine whether or not the media player/decoder combination works properly for each of multiple different test settings either in a test environment or when operated in the field by a user retrieving data from a remote website.

Figure 2:
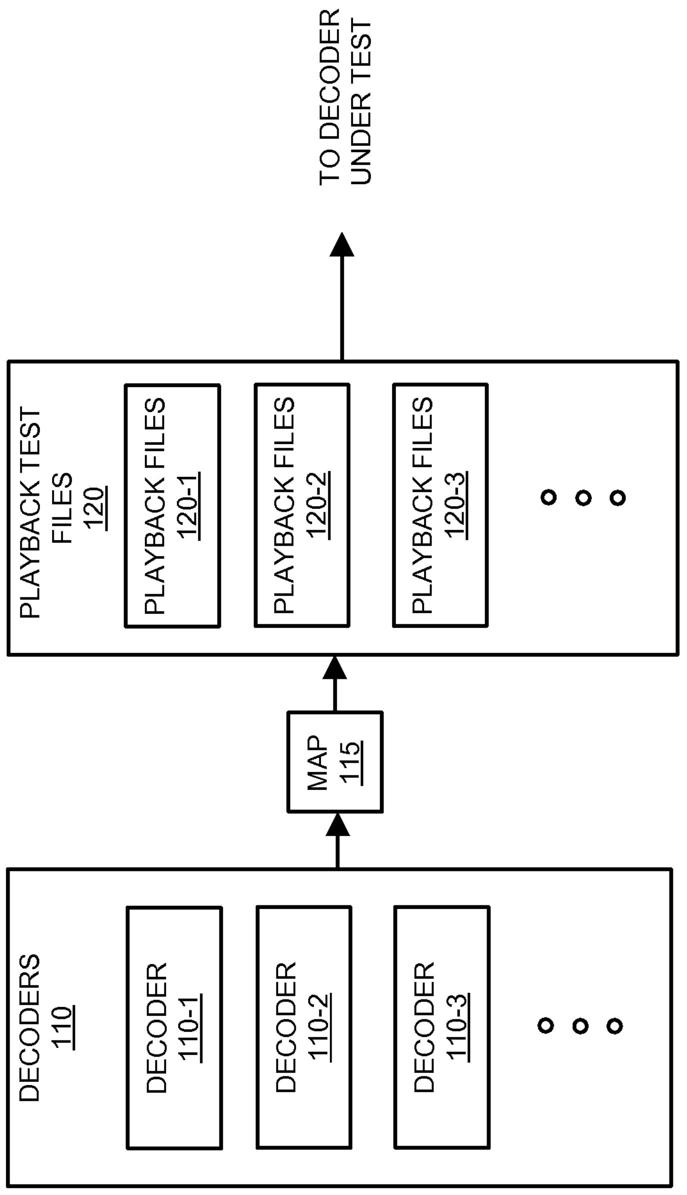
FIG. 2 is an example diagram illustrating audio test files according to embodiments herein.

FIG. 2 is an example diagram illustrating the multiple decoders 110 and respective sets of playback files 120 according to embodiments herein. As shown, map 115 provides an indication that set of playback files 120-1 are designated for testing decoder 110-1, set of playback files 120-2 are designated for testing decoder 110-2, set of playback files 120-3 are designated for testing decoder 110-3, and so on.

Decoder 110-1 supports a first decoding format; decoder 110-2 supports a second decoding format; decoder 110-3 supports a third decoding format, and so on. In one embodiment, the test manager 140 selects a particular decoding format to test by configuring the media player 135 with a corresponding one of decoders 110.

Figure 3:
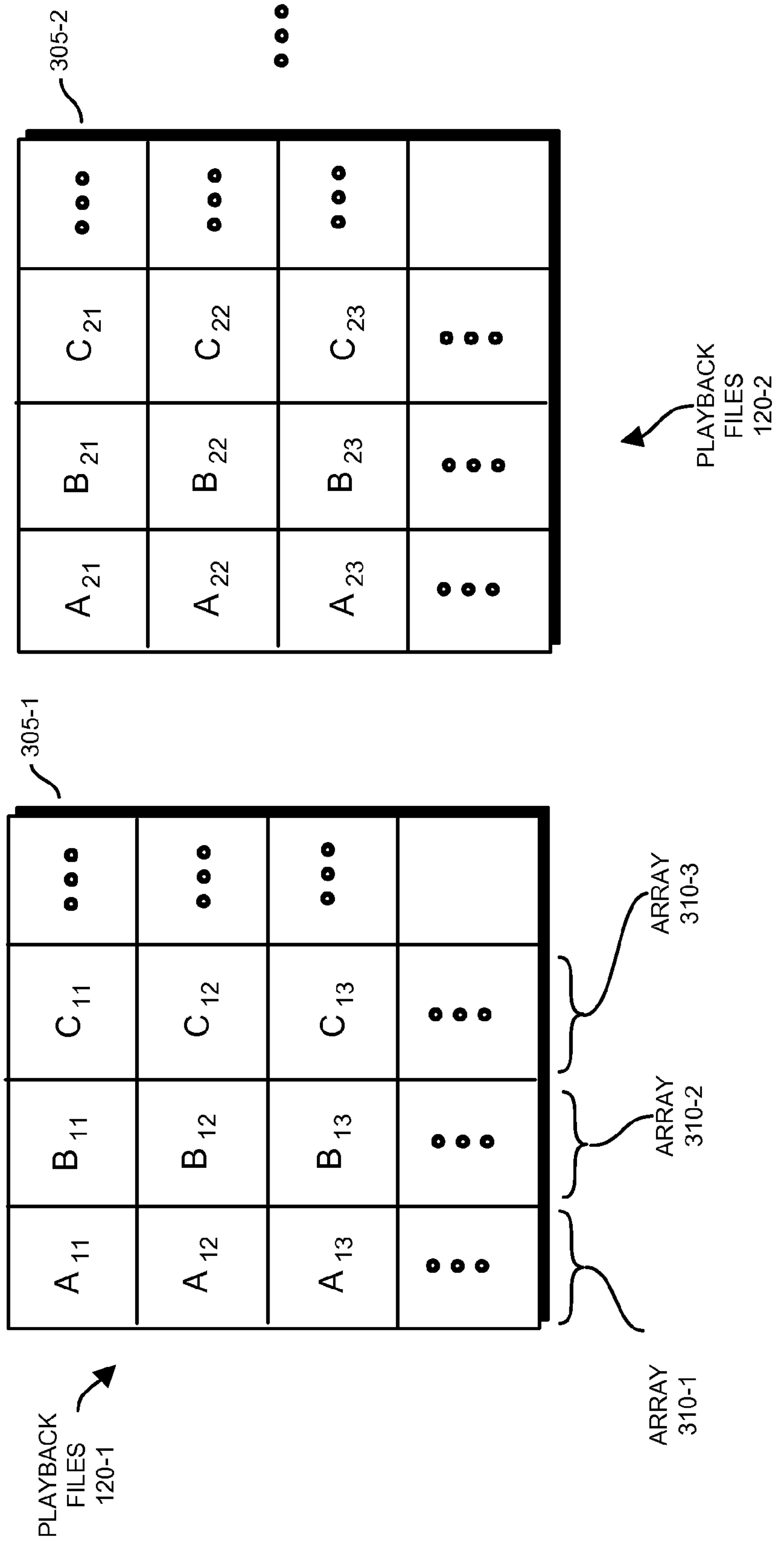
FIG. 3 is an example diagram illustrating matrices for testing different decoders according to embodiments herein.

FIG. 3 is a diagram illustrating example matrices of playback data according to embodiments herein. As shown, one or more matrices of playback information store playback data for testing respective decoders.

Playback data and/or instructions in each of matrices 305 are labeled in accordance with the form $X_{YZ}$. The letter X represents the parameter being tested. The subscript letter Y indicates the decoder to which the playback data is applicable for testing purposes. The subscript letter Z represents the various versions of settings for testing a given parameter of a decoder. Thus, playback data labeled $A_{11}$ in matrix 305-1 represents a first setting of encoded audio data for testing parameter A associated with decoder #1 (e.g., decoder 110-1); playback data labeled $B_{22}$ in matrix 305-2 represents a second setting of encoded audio data for testing parameter B associated with decoder #2 (e.g., decoder 110-2); playback data labeled $C_{13}$ represents a third setting of encoded audio data for testing parameter C associated with decoder #3 (e.g., decoder 110-3), and so on. Each array 310 thus represents multiple test settings for testing a certain parameter under test.

Note that any number of parameters (e.g., A, B, C, . . . ) can be tested for a given format supported by a respective decoder. Each matrix may, but need not, include the same parameters to be tested. For example, matrix 305-1 can include playback data settings for testing parameters A, B, C, and D; matrix 305-2 include playback data settings for testing parameters A, B, C, and G, and so on.

Also, note that a matrix can include any number of different test settings for a given parameter under test. For example, parameter A in array 310-1 of matrix 305-1 may have five different setting variations for testing decoder 110-1; parameter B in array 310-2 of matrix 305-1 may have five different setting variations for testing decoder 110-1, and so on.

As previously discussed, each playback file and/or data in a respective matrix can be pre-generated, encoded sets of data for streaming to a respective decoder under test 130. In other embodiments, a playback file includes appropriate instructions and/or parameter settings in which to generate a test audio stream for transmitting to and testing the decoder under test 130.

Although particular settings for a given parameter can be varied to test a respective decoder as described herein, respective playback data for other parameters can be kept constant for the other parameters while testing a given parameter. For example, playback data $A_{11}$, $A_{12}$, $A_{13}$, can be used to test different bit rate settings while other parameters associated with the playback data such as sample size, compression type, etc., are kept constant for each of the test cases. Thus, a bit rate can be varied while other parameters are kept constant.

In one embodiment, matrix 305-1 stores playback data (e.g., playback files 120-1) for testing decoder 110-1. For example, the matrix 305-1 includes playback data for testing different decoder parameter A, B, Content, etc. Playback data $A_{11}$, $A_{12}$, $A_{13}$, . . . can be used to test a first parameter such as a bit rate of the decoder 110-1. Playback data $A_{11}$ can include audio data streamed to the decoder 110-1 at a first bit rate; playback data $A_{12}$ can include audio data streamed to the decoder 110-1 at a second bit rate; playback data $A_{13}$ can include audio data streamed to the decoder 110-1 at a third rate, and so on.

Accordingly, because settings are varied for a given parameter, a respective array of a matrix of playback data can be used to verify the decoder/media player across a range of settings for the given parameter.

Each set of playback data can include encoded data for testing multiple different audio frequencies. For example, playback file $A_{11}$ can include encoded data to test the ability of the media player to reproduce respective 20 Hertz, 40, Hertz, and 80 Hertz test frequencies; playback file $A_{12}$ can include encoded data to test the ability of the media player to reproduce respective 20 Hertz, 40, Hertz, and 80 Hertz test frequencies, and so on. Thus, a given decoder/media player/test platform combination can be tested at a number of different test tones for each of multiple different settings of a selected parameter.

Playback data $B_{11}$, $B_{12}$, $B_{13}$, . . . can be used to test a second parameter B such as a compression type supported by the decoder 110-1. For example, playback data $B_{11}$ can include audio data encoded according to a first compression type to test decoder 110-1; playback data $B_{12}$ can include audio data encoded according to a second compression type for testing decoder 110-1; playback data $B_{13}$ can include audio data encoded according to a third compression type for testing decoder 110-1, and so on.

In a similar manner as discussed above, each of the playback data settings in matrix can included encoded data for testing the decoder/media player/test platform at a number of different test tones for each of multiple different settings for the given parameter.

Playback data $C_{11}$, $C_{12}$, $C_{13}$, . . . can be used to test a third parameter C such as an audio sample size supported by the decoder 110-1. For example, playback data $C_{11}$ can include audio data encoded according to a first audio sample data size to test decoder 110-1; playback data $C_{12}$ can include audio data encoded according to a second audio sample data size for testing decoder 110-1; playback data $C_{13}$ can include audio data encoded according to a third audio data sample size for testing decoder 110-1, and so on.

Accordingly, a given matrix of playback data can be used to test multiple parameters of a given encoding format.

Referring again to FIG. 1, test manager 140 can configure the media player 135 with decoder 110-1. Via map 115, test manager 140 identifies that matrix 305-1 includes appropriate playback data for testing decoder 110-1. The test manager 140 then proceeds with testing the decoder under test 130 with the different test samples in the selected matrix. For each setting (e.g., $A_{11}$, $A_{12}$, $A_{13}$, . . . , $B_{11}$, $B_{12}$, $B_{13}$, . . . $C_{11}$, $C_{12}$ . . . ) tested, the tone analyzer 160 can analyze a frequency of test tones produced by the audio signal generator 150 of media player 135.

In one embodiment, the tone analyzer 160 includes a zero crossing detector to determine a frequency of tones produced by the playback data being tested on the decoder under test 130. The test tones can be encoded sine wave data that, when played back by media player 135, reproduce a sine wave audio tone or signal (e.g., digital or analog representation of audio) to be analyzed by tone analyzer 160. The tone analyzer 160 can receive information from test manager 140 of a frequency range in which the test signal produced by media player should reside. If the test signal falls outside the range, the tone analyzer 160 flags the error and creates a log of the failure for storage in repository 180.

Note that test manager 140 can vary the test platform 175 (e.g., computer hardware, computer software, etc.) on which the media player 135 is operated. For example, the test platform 175 can be one of multiple different types of computer systems for operating media player 135.

For a first test platform such as a first type of computer system and corresponding processor, the test manager 140 can configure media player 135 with decoder 110-1 and initiate testing of the playback data in matrix 305-1. For a second test platform such as a second type of computer system and corresponding processor, the test manager 140 can configure media player 135 with decoder 110-1 and initiate testing of the playback data in matrix 305-1. Accordingly, the same matrix can be used to test the media player and corresponding decoder across different platforms.

In a similar manner, subsequent to testing decoder 110-1, test manager 140 can configure media player with decoder 110-2 and test the decoder 110-2 with matrix 305-2 for each of multiple different platforms 175.

Figure 4:
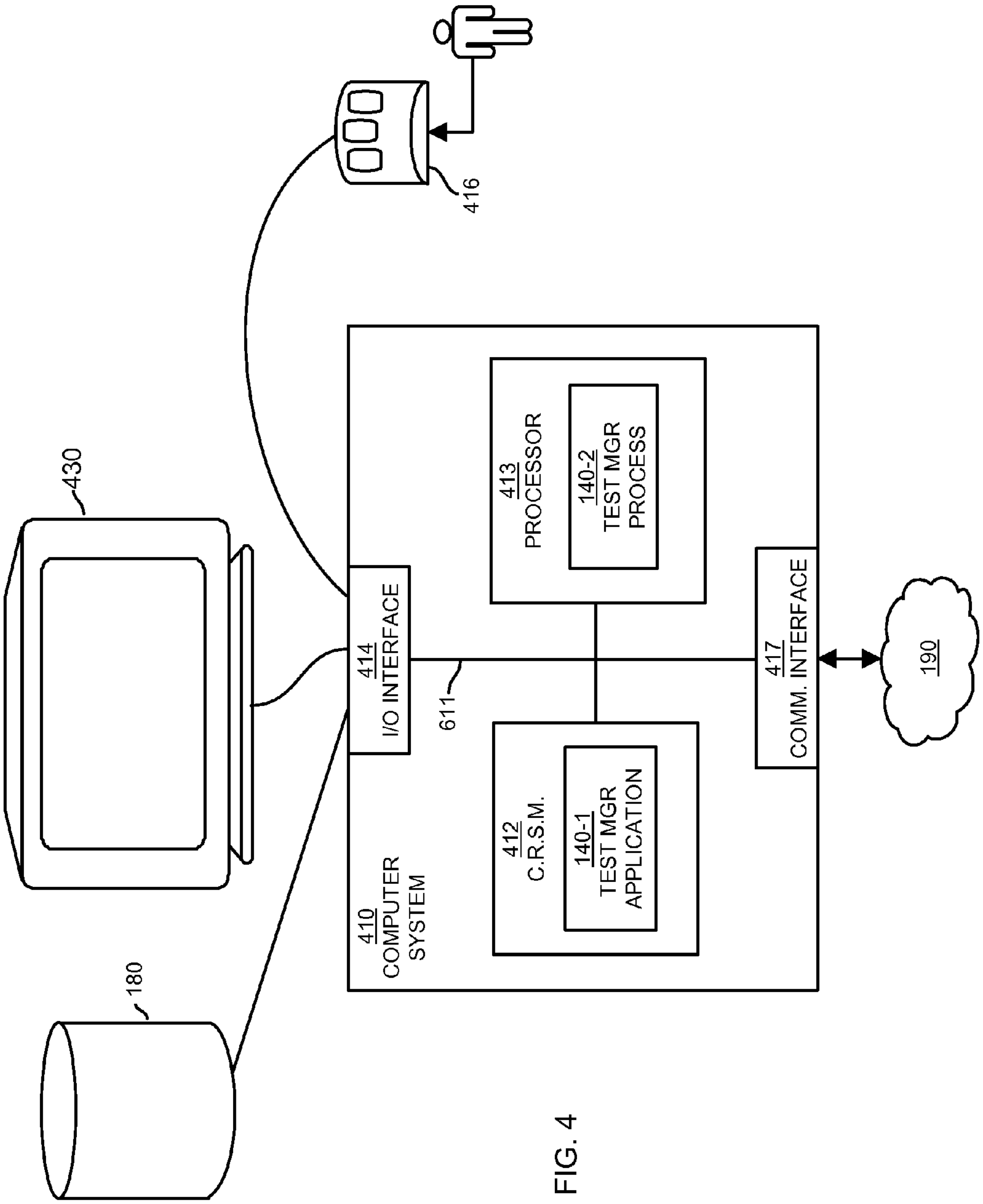
FIG. 4 is a diagram illustrating an example computer architecture for executing a test manager application according to embodiments herein.

FIG. 4 is a block diagram of an example environment including an architecture of a respective computer system 410 for implementing test control functions according to embodiments herein.

Computer system 410 can be a computerized device such as a personal computer, workstation, portable computing device, console, network terminal, processing device, network device, etc., operating as a server, client, etc.

Note that the following discussion provides a basic embodiment indicating how to carry out functionality associated with test manager application 140-1. It should be noted that the actual configuration for carrying out the operations as described herein can vary depending on a respective application.

As shown, computer system 410 of the present example includes an interconnect 411 that couples computer readable storage media 412, a processor 413, I/O interface 414, and a communications interface 417. I/O interface 414 provides connectivity to peripheral devices 416, if such devices are present, such as a keyboard, repository 180, a computer mouse, display screen 430, etc.

Computer readable storage medium 412 can be any suitable device to store data such as memory, optical storage, etc.

Communications interface 417 enables computer system 410 and, more particularly, test manager application 140-1 to communicate over network 190 to retrieve information from remote sources as needed to perform test functions. I/O interface 614 also enables the test manager application 140-1 to retrieve locally stored information from repository 180.

As shown, computer readable storage media 412 can be encoded with test manager application 140-1 that supports functions as discussed above and as discussed further below. The test manager application 140-1 can be embodied as software code such as data and/or logic instructions. When executed, the code stored on computer storage media 412 can support processing functionality according to different embodiments described herein.

During operation of one embodiment, processor 413 accesses computer readable storage media 412 via the use of interconnect 411 in order to launch, run, execute, interpret or otherwise perform the logic instructions of the test manager application 140-1. Execution of the test manager application 140-1 produces processing functionality in test manager process 140-2. In other words, the test manager process 140-2 represents one or more aspects of the test manager application 140-1 performing within or upon the processor 413 in the computer system 410.

It should be noted that, in addition to the test manager process 140-2 that carries out method operations as discussed herein, other embodiments herein include the test manager 140-1 itself such as the un-executed or non-performing logic instructions and/or data. As mentioned, the test manager application 140-1 may be stored on computer readable storage media 412 such as a floppy disk, hard disk, optical media, etc. According to other embodiments, the test manager application 140-1 can also be stored on a computer readable storage media such as a memory type system such as in firmware, read only memory (ROM), or, as in this example, as executable code.

In addition to these embodiments, it should also be noted that other embodiments herein include the execution of the functionality as described herein via processor 413. Thus, those skilled in the art will understand that the computer system 410 can include other processes and/or software and hardware components, such as an operating system that controls allocation and use of hardware resources.

As mentioned above, the computer system 410 can support execution of test manager application 140-1 according to embodiments herein. It should be noted that a similar type of computer architecture with a processor, memory, and executable software instructions can be used to support execution of the media player 135.

Functionality supported by computer system 910 and, more particularly, functionality associated with the test manager application 140 will now be discussed via flowcharts in FIGS. 5-7. As discussed above, the test manager application 140 can be configured to execute the steps in the flowcharts.

Note that there will be some overlap with respect to concepts discussed above for FIGS. 1 through 4. Also, note that the steps in the below flowcharts need not always be executed in the order shown. The steps can be executed in any suitable order.

Figure 5:
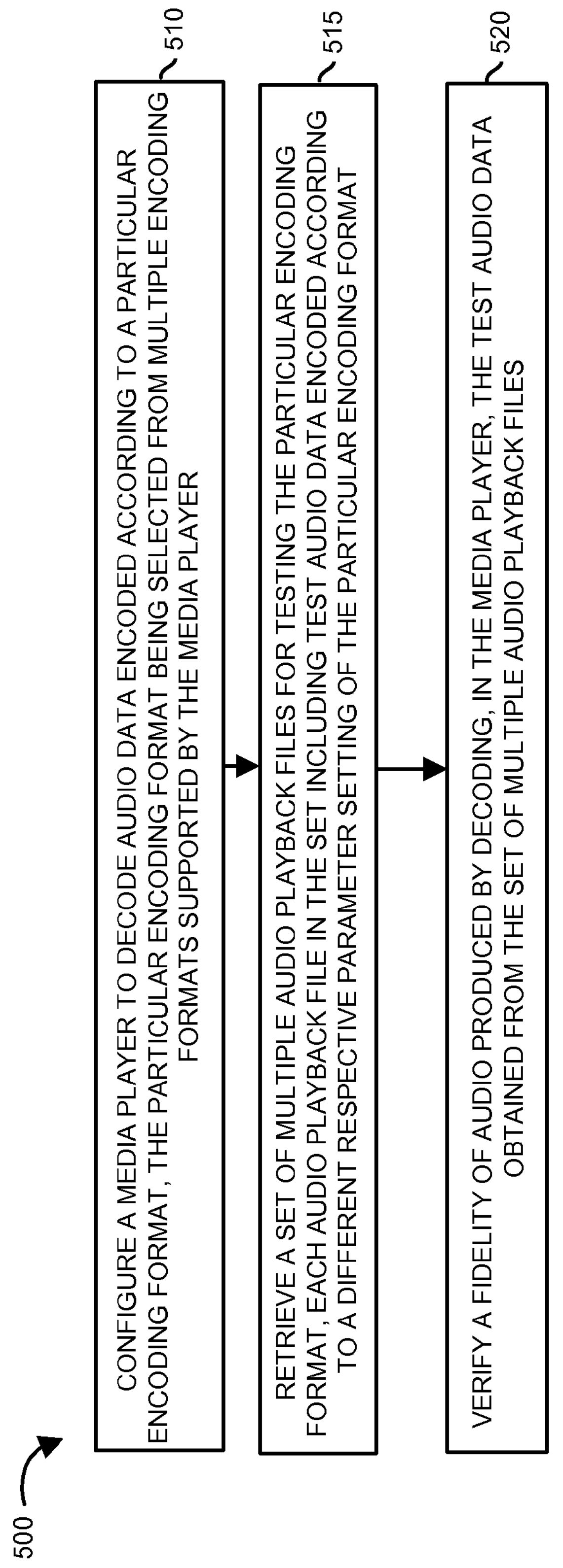
FIG. 5 is a flowchart illustrating an example method according to embodiments herein.

FIG. 5 is a flowchart 500 illustrating a technique of testing a media player 135 according to embodiments herein.

In step 510, the test manager 140 initiates configuring a media player 135 to decode audio data encoded according to a particular encoding format. The test manager can select the particular encoding format or decoder from multiple encoding formats or decoders supported by the media player 135.

In step 515, the test manager 140 retrieves a set of multiple audio playback files such as a respective matrix of playback date for testing the particular encoding format. Each audio playback file in the set can include test audio data encoded according to a different respective parameter setting of the particular encoding format.

In step 520, the test manager 140 verifies the fidelity of audio produced by decoding, in the media player 135, the test audio data obtained from the set of multiple audio playback files. In one embodiment, the test audio data transmitted to the decoder under test 130 is encoded according to different respective parameter settings of the particular encoding format in order to test the decoder/media player combination.

In one embodiment, the step of retrieving the set of multiple audio playback files for testing the particular encoding format includes accessing the test audio data from an array (e.g., column) of playback data in a respective matrix having multiple different test settings for a given parameter associated with the particular encoding format. The step of verifying fidelity of audio produced by decoding can include verifying that the multiple different settings for the given parameter fall within an acceptable frequency range for the audio data under test.

Embodiments herein can include repeating the above steps to test each of multiple different decoders via the different playback files.

Figure 6:
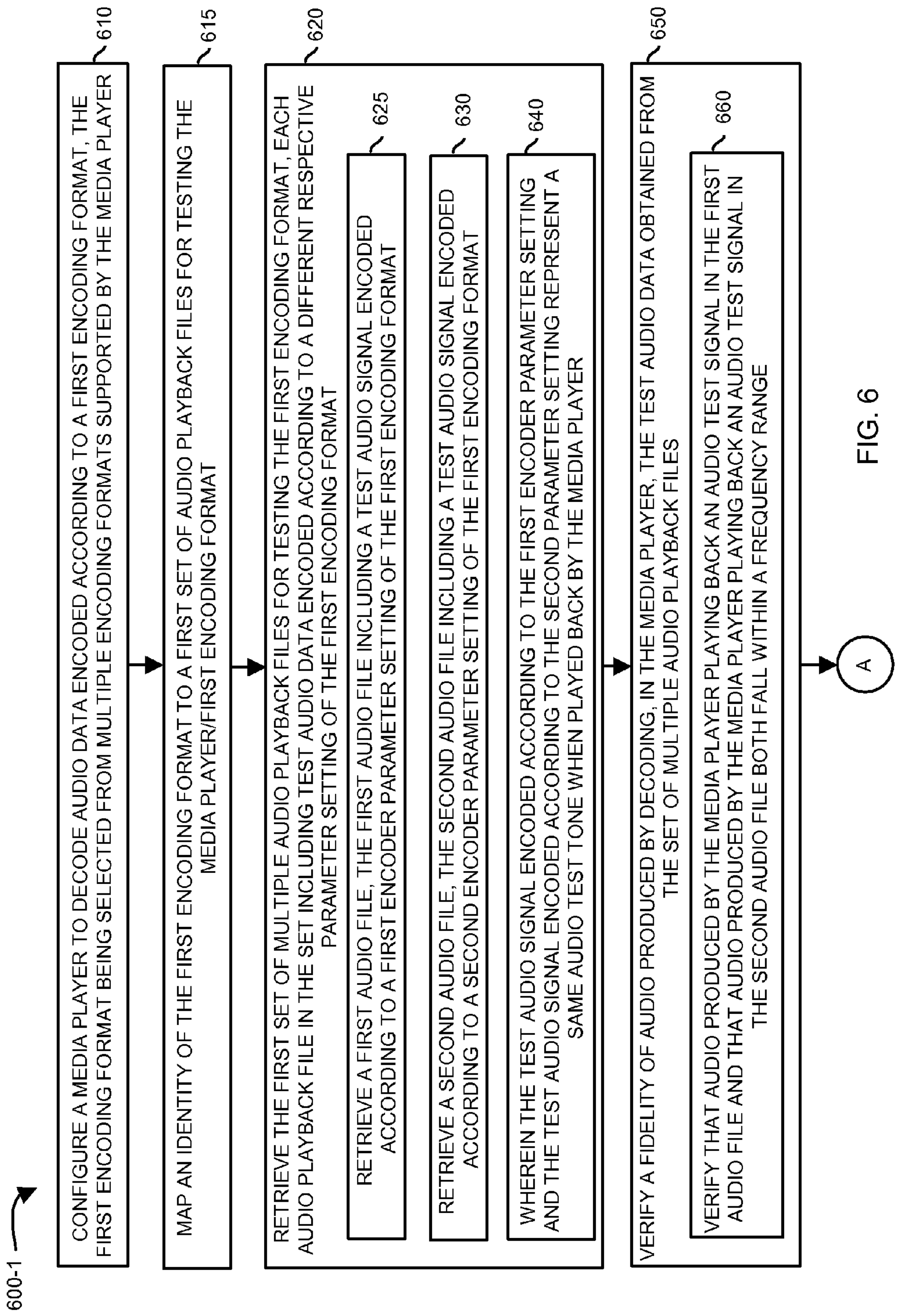
FIGS. 6 and 7 combine to form a flowchart illustrating an example method according to embodiments herein.
Figure 7:
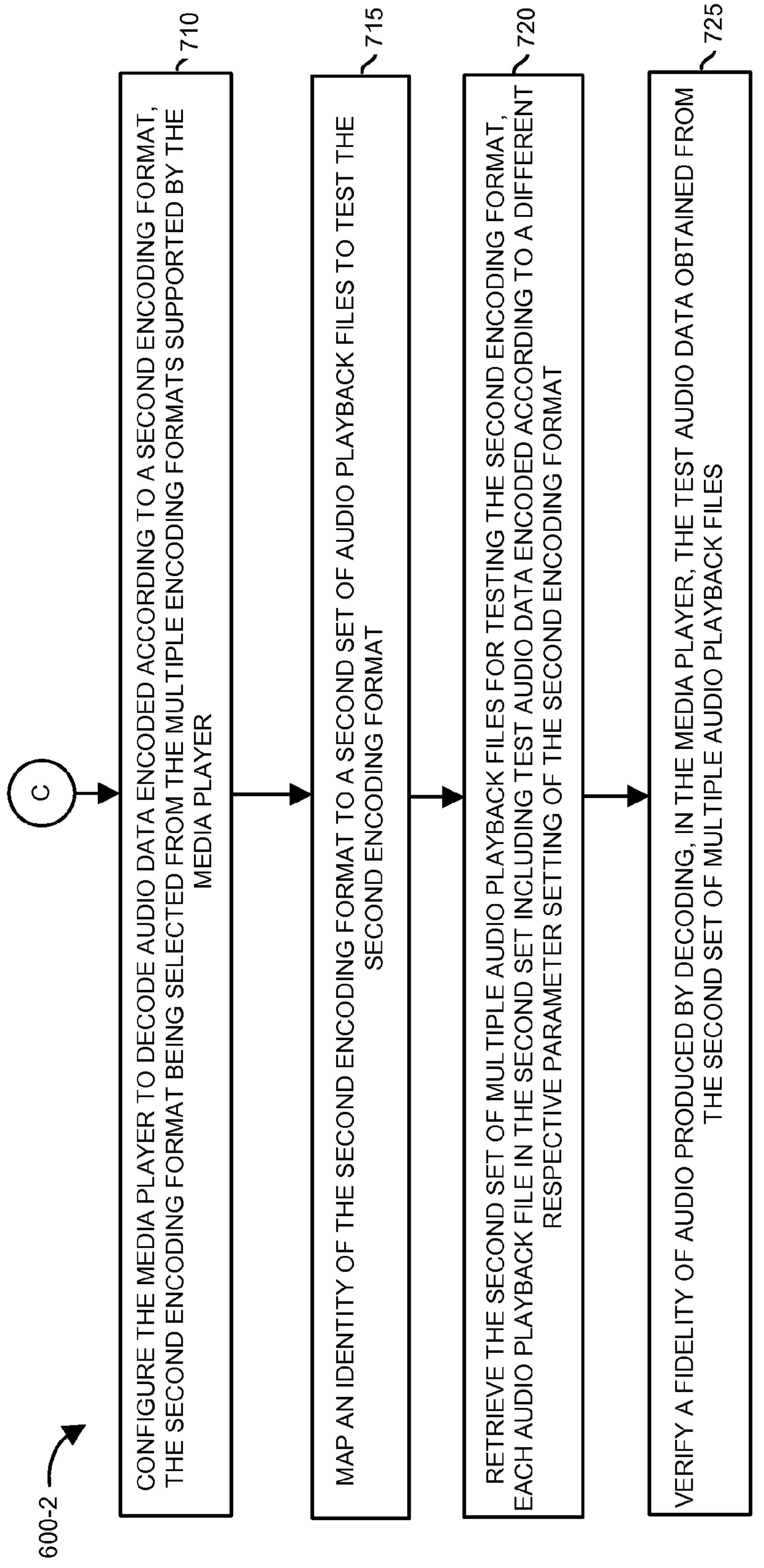

FIGS. 6 and 7 combine to form a more detailed flowchart 600 (e.g., flowchart 600-1 and flowchart 600-2) illustrating test management according to embodiments herein.

In step 610, the test manager 140 configures a media player 135 to decode audio data encoded according to a first encoding format via configuring the media player 135 with a first decoder. The test manager 140 selects the first encoding format or decoder from multiple encoding formats or decoders 110 supported by the media player 135.

In step 615, via map 115, the test manager 140 maps an identity of the first encoding format (e.g., decoder 110-1) to a first set of audio playback files (e.g., matrix 305-1 for testing decoder 110-1 and first encoding format.

In step 620, the test manager 140 retrieves a first set of multiple audio playback files for testing the first encoding format. Each audio playback file in the retrieved set of playback data of matrix 305-1 includes test audio data encoded according to a different respective parameter setting of the first encoding format.

In step 625, the test manager 140 retrieves a first audio file or playback data from a respective matrix, the first audio file including a test audio signal encoded according to a first parameter setting of the first encoding format.

In step 630, the test manager 140 retrieves a second audio file, the second audio file including a test audio signal encoded according to a second parameter setting of the first encoding format.

As indicated in step 640, the test audio signal encoded according to the first parameter setting and the test audio signal encoded according to the second parameter setting can represent a same audio test tone when played back by the media player.

In step 650, the test manager 140 verifies the fidelity of audio produced by decoding, in the media player 135, the test audio data obtained from the set of multiple audio playback files.

In step 660, the test manager 140 verifies that audio produced by the media player 135 playing back an audio test signal in the first audio file and that audio produced by the media player 135 playing back an audio test signal in the second audio file both fall within a frequency range.

In step 710, the test manager 140 configures the media player 135 to decode audio data encoded according to a second encoding format, the second encoding format being selected from the multiple encoding formats supported by the media player 135.

In step 715, the test manager 140 maps an identity of the second encoding format to a second set of audio playback files to test the second encoding format.

In step 720, the test manager 140 retrieves the second set of multiple audio playback files for testing the second encoding format, each audio playback file in the second set including test audio data encoded according to a different respective parameter settings of the second encoding format.

In step 725, the test manager 140 verifies the fidelity of audio produced by decoding, in the media player 135, the test audio data obtained from the second set of multiple audio playback files.

Note again that techniques herein are well suited for testing of multiple decoders associated with a media player as described herein. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as “processing,” “computing,” “calculating,” “determining” or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A computer-implemented method in which at least one processing device initiates execution of software instructions to perform steps of:

configuring, by the at least one processing device, a media player to decode audio data encoded according to an encoding format, the encoding format being selected for testing from multiple encoding formats supported by the media player;

retrieving, by the at least one processing device, a plurality of audio playback files for testing the encoding format, each of the plurality of audio playback files including test audio data encoded according to a different respective parameter setting of the encoding format; and verifying, by the at least one processing device, fidelity of audio produced by decoding, in the media player, the test audio data encoded according to the different respective parameter settings of the encoding format, wherein verifying the fidelity comprises determining that the audio produced by the decoding has a frequency within a specified frequency range, wherein the specified frequency range includes a plurality of frequencies that includes an input frequency of the test audio data.

2. The computer-implemented method as in claim 1 further comprising:

mapping, via a map, an identity of the encoding format to the plurality of audio playback files, the map indicating that the plurality of audio playback files has been designated for testing the encoding format.

3. The computer-implemented method as in claim 2, wherein retrieving the plurality of audio playback files for testing the encoding format includes:

retrieving a first audio file, the first audio file including a test audio signal encoded according to a first parameter setting of the encoding format; and retrieving a second audio file, the second audio file including a test audio signal encoded according to a second parameter setting of the encoding format.

4. The computer-implemented method as in claim 3, wherein both the test audio signal encoded according to the first parameter setting and the test audio signal encoded according to the second parameter setting represent a same audio test tone when played back by the media player.

5. The computer-implemented method as in claim 1, wherein the encoding format is a first encoding format, the computer-implemented method further comprising:

subsequent to testing an ability of the media player to decode according to the first encoding format:

configuring the media player to decode audio data encoded according to an additional encoding format, the additional encoding format being selected from the multiple encoding formats supported by the media player;

mapping, via a map, an identity of the additional encoding format to an additional plurality of audio playback files, the map indicating that the additional plurality of audio playback files has been designated for testing the encoding format;

retrieving the additional plurality of audio playback files for testing the additional encoding format, each of the additional plurality of audio playback files including test audio data encoded according to different parameter settings of the additional encoding format; and verifying fidelity of audio produced by decoding, in the media player, the test audio data retrieved from the additional plurality of audio playback files.

6. The computer-implemented method as in claim 5, wherein retrieving the plurality of audio playback files for testing the first encoding format includes:

retrieving a first audio file from the plurality of audio playback files, the first audio file from the plurality of audio playback files including a test audio signal encoded according to a first parameter setting of the encoding format;

retrieving a second audio file from the plurality of audio playback files, the second audio file from the plurality of audio playback files including a test audio signal encoded according to a second parameter setting of the encoding format; and both the test audio signal encoded according to the first parameter setting and the test audio signal encoded according to the second parameter setting representing a same audio test tone when played back by the media player.

7. The computer-implemented method as in claim 6, wherein retrieving the plurality of audio playback files for testing the first encoding format includes:

retrieving an additional first audio file from the additional plurality of audio playback files, the additional first audio file including an additional test audio signal encoded according to an additional first parameter setting of the additional encoding format; and retrieving an additional second audio file from the additional plurality of audio playback files, the additional second audio file including an additional test audio signal encoded according to an additional second parameter setting of the additional encoding format; and both the additional test audio signal encoded according to the first parameter setting and the additional test audio signal encoded according to the second parameter setting representing the same audio test tone when played back by the media player.

8. The computer-implemented method as in claim 1 further comprising:

while executing the media player on a first computer platform, verifying the fidelity of audio produced by decoding the test audio data obtained from the plurality of audio playback files;

initiating execution of the media player on a second computer platform; and while executing the media player on the second computer platform, verifying the fidelity of audio produced by decoding the test audio data obtained from the plurality of audio playback files.

9. The computer-implemented method as in claim 1 further comprising:

retrieving a first audio file from the plurality of audio playback files, the first audio file including a test audio signal encoded according to a first bit rate setting of the encoding format;

operating the media player to decode the test audio signal in the first audio file based on the encoding format and the first bit rate setting; and verifying that a first audio signal produced by decoding, in the media player, of the test audio signal in the first audio file is within the specified frequency range.

10. The computer-implemented method as in claim 9 further comprising;

retrieving a second audio file from the plurality of audio playback files, the second audio file including a test audio signal encoded according to a second bit rate setting of the encoding format;

operating the media player to decode the test audio signal in the second audio file based on the encoding format and the second bit rate setting; and verifying that a second audio signal produced by decoding, in the media player, of the test audio signal in the second audio file is within the specified frequency range.

11. The computer-implemented method as in claim 1 further comprising:

retrieving a first audio file from the plurality of audio playback files, the first audio file including a test audio signal encoded according to a first compression setting of the encoding format;

operating the media player to decode the test audio signal in the first audio file based on the encoding format and the first compression setting;

verifying that a first audio signal produced by decoding, in the media player, of the test audio signal in the first audio file is within the specified frequency range;

retrieving a second audio file from the plurality of audio playback files, the second audio file including a test audio signal encoded according to a second compression setting of the encoding format;

operating the media player to decode the test audio signal in the second audio file based on the encoding format and the second compression setting; and verifying that a second audio signal produced by decoding, in the media player, of the test audio signal in the second audio file is within the specified frequency range.

12. The computer-implemented method as in claim 1, wherein verifying the fidelity of audio produced by decoding in the media player includes:

verifying that first test audio data obtained from the plurality of audio playback files as played back by the media player produces a first audio signal, wherein the frequency of the first audio signal is within the specified frequency range, wherein the first test audio data is encoded according to a first sample rate; and verifying that second test audio data obtained from the plurality of audio playback files as played back by the media player produces a second audio signal, wherein the frequency of the second audio signal is within the specified frequency range, wherein the second test audio data is encoded according to a second sample rate.

13. The computer-implemented method as in claim 1, wherein retrieving the plurality of audio playback files for testing the encoding format includes accessing the test audio data from an array of playback data having multiple different test settings for a given parameter associated with the encoding format; and wherein verifying the fidelity of the audio produced by the decoding comprises verifying that the frequency of the audio produced by the media player is within the specified frequency range for the multiple different test settings for the given parameter.

14. The computer-implemented method as in claim 1, wherein determining that the audio produced by the decoding has the frequency within the specified frequency range comprises:

analyzing a plurality of audio tones of a sine wave generated by the audio produced by the decoding to determine the frequency from the plurality of audio tones;

accessing the frequency range from a non-transitory computer-readable medium; and comparing the frequency to the frequency range.

15. The method of claim 1, further comprising, prior to configuring the media player to decode the audio data:

selecting, by the at least one processing device, the encoding format for testing from multiple encoding formats, wherein the encoding format includes a plurality of encoding parameters; and identifying, by the at least one processing device, a respective range of parameter settings for each of the plurality of encoding parameters;

wherein retrieving the plurality of playback files comprises selecting the plurality of playback files based on the respective range of parameter settings identified for each of the plurality of encoding parameters.

16. A non-transitory computer-readable storage medium having instructions stored thereon for processing data information, such that the instructions, when carried out by a processing device, enable the processing device to perform operations of:

configuring a media player to decode audio data encoded according to an encoding format, the encoding format being selected for testing from multiple encoding formats supported by the media player;

retrieving a plurality of audio playback files for testing the encoding format, each audio playback file in the plurality of audio playback files including test audio data encoded according to a different respective parameter setting of the encoding format; and verifying fidelity of audio produced by decoding, in the media player, the test audio data encoded according to different respective parameter settings of the encoding format, wherein verifying the fidelity comprises determining that the audio produced by the decoding has a frequency within a specified frequency range, wherein the specified frequency range includes a plurality of frequencies that includes an input frequency of the test audio data.

17. The non-transitory computer-readable storage medium as in claim 16 further including instructions stored thereon that when carried out by the processing device enables operations of:

retrieving a first audio file from the plurality of audio playback files, the first audio file including a test audio signal encoded according to a first bit rate setting of the encoding format;

operating the media player to decode the test audio signal in the first audio file based on the encoding format and the first bit rate setting;

verifying that a first audio signal produced by decoding, in the media player, of the test audio signal in the first audio file is within the specified frequency range;

retrieving a second audio file from the plurality of audio playback files, the second audio file including a test audio signal encoded according to a second bit rate setting of the encoding format;

operating the media player to decode the test audio signal in the second audio file based on the encoding format and the second bit rate setting; and verifying that a second audio signal produced by decoding, in the media player, of the test audio signal in the second audio file is within the specified frequency range.

18. The non-transitory computer-readable storage medium as in claim 16 further including instructions stored thereon that when carried out by the processing device enables operations of:

retrieving a first audio file from the plurality of audio playback files, the first audio file including a test audio signal encoded according to a first compression setting of the encoding format;

operating the media player to decode the test audio signal in the first audio file based on the encoding format and the first compression setting;

verifying that an audio signal produced by decoding, in the media player, of the test audio signal in the first audio file is within the specified frequency range;

retrieving a second audio file from the plurality of audio playback files, the second audio file including a test audio signal encoded according to a second compression setting of the encoding format;

operating the media player to decode the test audio signal in the second audio file based on the encoding format and the second compression setting; and verifying that an audio signal produced by decoding, in the media player, of the test audio signal in the second audio file is within the specified frequency range.

19. The non-transitory computer-readable storage medium as in claim 16 further including instructions stored thereon that when carried out by the processing device enables operations of:

retrieving a first audio file from the plurality of audio playback files, the first audio file including a test audio signal encoded according to a first compression setting of the encoding format;

operating the media player to decode the test audio signal in the first audio file based on the encoding format and the first compression setting;

verifying that a first audio signal produced by decoding, in the media player, of the test audio signal in the first audio file is within the specified frequency range;

retrieving a second audio file from the plurality of audio playback files, the second audio file including a test audio signal encoded according to a second compression setting of the encoding format;

operating the media player to decode the test audio signal in the second audio file based on the encoding format and the second compression setting; and verifying that a second audio signal produced by decoding, in the media player, of the test audio signal in the second audio file is within the specified frequency range.

20. A computer system comprising:

a processor;

a memory unit that stores instructions associated with an application executed by the processor; and an interconnect coupling the processor and the memory unit, enabling the computer system to execute the application and perform operations of:

configuring a media player to decode audio data encoded according to an encoding format, the encoding format being selected from multiple encoding formats supported by the media player;

retrieving a plurality of audio playback files for testing the encoding format, each audio playback file in the plurality of audio playback files including test audio data encoded according to a different respective parameter setting of the encoding format; and verifying fidelity of audio produced by decoding, in the media player, the test audio data encoded according to different respective parameter settings of the encoding format, wherein verifying the fidelity comprises determining that the audio produced by the decoding has a frequency within a specified frequency range, wherein the specified frequency range includes a plurality of frequencies that includes an input frequency of the test audio data.

* * * * *